M. DOUJAK.
AUTOMOBILE SAFETY DEVICE.
APPLICATION FILED FEB. 13, 1922.
1,417,305. Patented May 23, 1922.
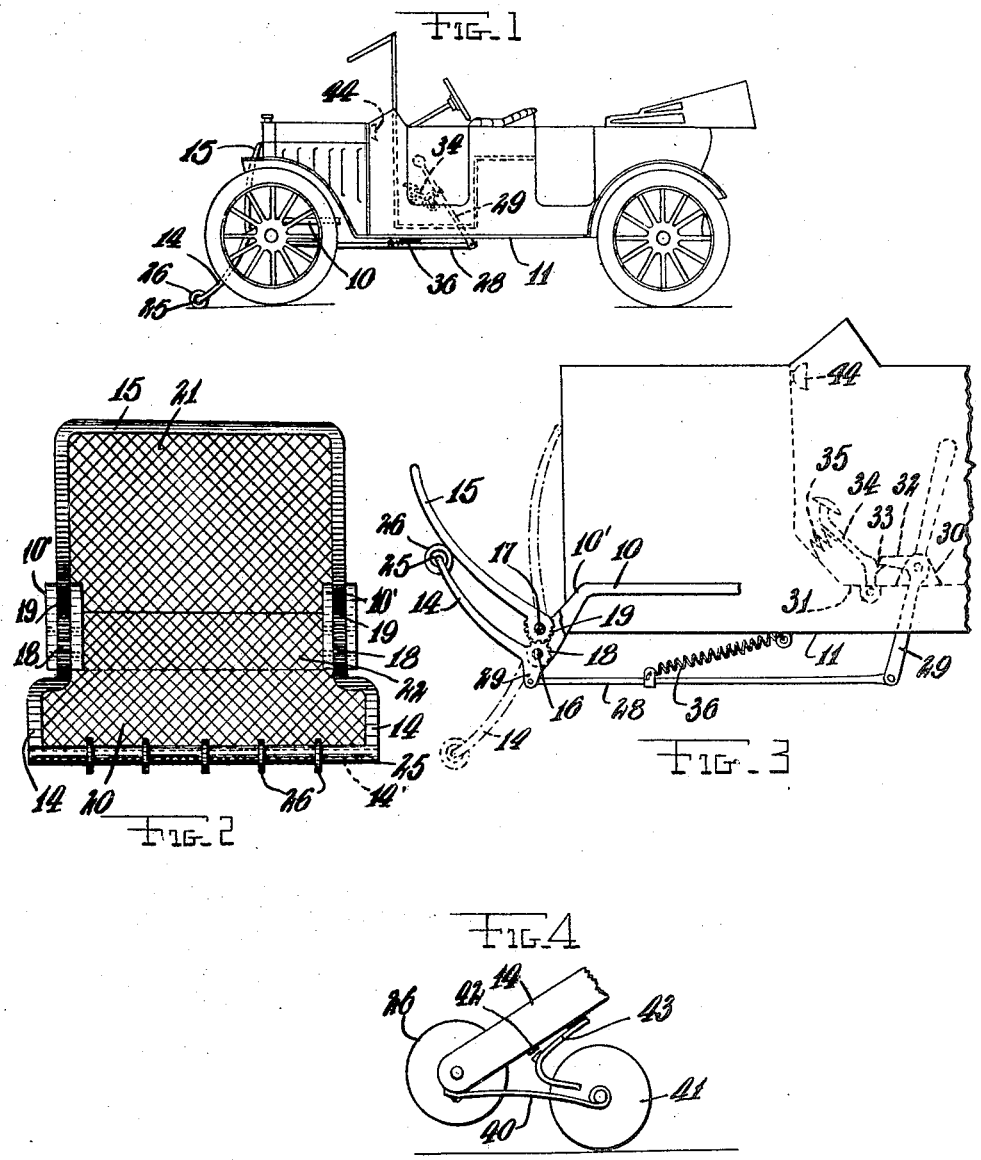
Inventor
Maria Doujak

UNITED STATES PATENT OFFICE.

MARIA DOUJAK, OF NEW YORK, N. Y.

AUTOMOBILE SAFETY DEVICE.

1,417,305.  Specification of Letters Patent.  Patented May 23, 1922.

Application filed February 13, 1922. Serial No. 536,183.

*To all whom it may concern:*

Be it known that I, MARIA DOUJAK, a citizen of Hungary, residing at New York, in the county of New York and State of New York, have invented certain new and useful Improvements in Automobile Safety Devices, of which the following is a specification.

This invention relates to fenders, or like safety attachments for motor vehicles, for the prevention of injury in the event of collision with human beings.

The present invention is an improvement on a previous one patented by me on July 13, 1920, No. 1,346,486 and it has for objects to facilitate the operation of the device, to provide the fender with a co-operating back element, and to provide a visual signal for use at night to indicate when one object is struck.

For further comprehension of the invention, and of the objects and advantages thereof, reference will be had to the following description and accompanying drawings, and to the appended claims in which the various novel features of the invention are more particularly set forth.

Fig. 1 of the drawings is a side view of an automobile to which my improved device has been attached.

Fig. 2 is a front view of the device in operative position.

Fig. 3 is a detail side view, with parts broken away showing the operative connection between the fender and back element.

Fig. 4 is a detail fragmentary elevation showing the contacts for signal device.

In the present improved construction I provide a pair of rigid arms 10 which are rigidly secured as set forth in my previous patent under the automobile body 11. These arms have inclined forked extremities 10′ in which the frame elements of the fender proper and co-operating back are pivoted. These frame elements are indicated at 14 and 15 respectively and are of general U-shape, the ends of the legs being pivotally attached to the forks 10′ at 16 and 17. The legs of the frame elements 14 and 15 have gear segments 18 and 19 respectively formed thereon and meshing with each other to cause the two frame elements to swing oppositely in unison. Attached to these frame elements are nets 20 and 21 respectively, made of wire or other suitable material, and which may be joined by an intermediate loose netting 22.

The horizontal bar 14′ of the fender frame member 14 is preferably covered with a rubber tubing 25 to protect the person struck from damage, while a series of rollers 26 are mounted thereon to allow the bar to run along the road without digging thereinto.

The fender and its co-operating back member occupy the position shown in full lines in Fig. 1 when not in use, being moved to the dotted line position when an object is to be picked up. The parts are held in the inoperative position shown by means of a rigid link 28 attached at its forward end to an arm 27 on one of the legs of the frame element 14, and at its rear end to a lever 29 pivoted to a bracket 30 on the floor of the automobile. This lever 29 has a rigid forwardly projecting finger 32 which engages over a shoulder 33 formed on a foot lever 34, spring 35 holding the foot lever in operative relation to the finger 32. Attached at one end to the link 28 and at its opposite end to the body of the automobile is a coiled tension spring 36 which normally urges the link 28 in a direction to move the parts to the operative position shown in dotted lines in Fig. 1.

It is believed that the manner of operation of my improved device will be clear from the foregoing description. In the normal position of the parts the fender acts as a bumper, as in my previous patent, for protecting the radiator, lamps, and front of the vehicle generally. In case of danger of striking a person, or any other movable object which might be injured, or might injure the vehicle if struck, the driver depresses the foot lever 34, freeing the shoulder 33 thereon from the finger 32 on lever 29. The tension spring 36, connected to link 28, throws the fender element down and the co-operating back element up, to the positions shown in dotted lines in Fig. 1, providing both a bottom member to pick up the object or individual struck and a back element which prevents the individual or object from striking against the radiator. To raise the fender the lever 29 is pulled back, the spring 35 throwing the shoulder 33 under the finger 32 when the fender has reached its normal position.

As indicated in Fig. 4 I may provide a signal means which will indicate when an object is struck by the fender, this being intended more particularly for use at night, when lack of light prevents objects in the path of the automobile being readily seen, and the automobile runs with the fender in lowered position. This device comprises a pair of resilient arms such as 40 fixed to opposite ends of the bar 14' and extending rearwardly therefrom and each having a roller 41 journaled in its rear end, this roller engaging the ground and holding the rollers 26 slightly raised therefrom. Mounted on the frame element is a fixed contact member 42 and a spring contact member 43, which latter is adapted to be engaged by the arm 40 to close the contacts when a weight rests on the fender. These contact members 42 and 43 form a switch for controlling an electric lamp 44 which acts as the signal means to indicate to the driver that an object has been struck.

Having thus described my invention what I claim as new and desire to protect by Letters Patent of the United States is as follows:

1. In combination with a motor vehicle, hinged fender and back elements, and operative connections therebetween to cause them to swing oppositely in unison, said connections comprising meshing gear segments.

2. In combination with a motor vehicle, hinged fender and back elements, meshing gear segments causing said fender and back elements to move oppositely in unison, a link connected at one end to said fender element, a lever to which the other end of said link is connected, a finger projecting from said lever, and a foot pedal having a detent shoulder engaging said lever.

3. In combination with a motor vehicle, hinged fender and back elements, meshing gear segments causing said fender and back elements to move oppositely in unison, a link connected at one end to said fender element, a lever to which the other end of said link is connected, a finger projecting from said lever, and a foot pedal having a detent shoulder engaging said lever, and a spring connected to said link and urging the fender to lowered position.

4. In combination with a motor vehicle, a hinged fender element, a resilient device adapted to hold said fender slightly spaced from the ground when lowered, an electric lamp, and a switch controlling said lamp, and comprising a pair of contact members one of which is operated by said resilient device, when a weight rests on the fender.

In testimony whereof I have affixed my signature.

MARIA DOUJAK.